US010104277B2

(12) United States Patent
Gyotoku

(10) Patent No.: US 10,104,277 B2
(45) Date of Patent: Oct. 16, 2018

(54) PANNING INDEX DISPLAY APPARATUS AND PROCESSING METHOD

(71) Applicant: CANON KABUSHIKI KAISHA, Tokyo (JP)

(72) Inventor: Takashi Gyotoku, Kawasaki-shi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/158,154

(22) Filed: May 18, 2016

(65) Prior Publication Data
US 2016/0344929 A1    Nov. 24, 2016

(30) Foreign Application Priority Data
May 20, 2015    (JP) .................................. 2015-102742

(51) Int. Cl.
H04N 5/225    (2006.01)
H04N 5/232    (2006.01)

(52) U.S. Cl.
CPC ....... H04N 5/2259 (2013.01); H04N 5/23222 (2013.01); H04N 5/23293 (2013.01); H04N 5/23254 (2013.01); H04N 5/23258 (2013.01)

(58) Field of Classification Search
None
See application file for complete search history.

(56) References Cited

U.S. PATENT DOCUMENTS

| 2002/0054211 A1* | 5/2002 | Edelson | G06T 7/20 348/169 |
| 2007/0110418 A1* | 5/2007 | Imada | G03B 5/04 396/55 |
| 2009/0268074 A1* | 10/2009 | Sugino | H04N 5/232 348/333.02 |
| 2012/0113307 A1* | 5/2012 | Watanabe | H04N 5/23219 348/333.01 |
| 2013/0063605 A1* | 3/2013 | Guan | G03B 17/38 348/169 |
| 2013/0120586 A1* | 5/2013 | Takashima | H04N 5/232 348/169 |
| 2016/0165138 A1* | 6/2016 | Haruna | H04N 5/23254 348/208.3 |
| 2017/0223261 A1* | 8/2017 | Shimizu | H04N 5/23212 |

FOREIGN PATENT DOCUMENTS

JP    2006-115322 A    4/2006

* cited by examiner

Primary Examiner — Justin P. Misleh
(74) Attorney, Agent, or Firm — Cowan, Liebowitz & Latman, P.C.

(57) ABSTRACT

A panning index display apparatus includes a panning information acquiring unit configured to acquire a panning index of an image pickup apparatus based on an output of a motion detecting unit configured to detect a motion of the image pickup apparatus to be panned, a motion vector acquiring unit configured to acquire an object moving index indicative of a movement of an object based on a motion vector generated using an output of an image sensor in panning, and a display control unit configured to display a relationship between the panning index and the object moving index on a display unit.

6 Claims, 11 Drawing Sheets ure of an image pickup apparatus, such as a camera, and more particularly to a panning index display apparatus configured to display a guidance in the panning capture (follow shot).

PANNING INDEX DISPLAY APPARATUS AND PROCESSING METHOD

BACKGROUND OF THE INVENTION

Field of the Invention

The present invention relates generally to an apparatus for controlling a display of a live-view video in an image pickup apparatus, such as a camera, and more particularly to a panning index display apparatus configured to display a guidance in the panning capture (follow shot).

Description of the Related Art

A follow shot is one image capturing method for capturing a moving object, such as an automobile, by panning an image pickup apparatus (referred to as a "camera" hereinafter) while following the object and by capturing the object at a shutter speed slower than a normal shutter speed. The follow shot provides a captured image (still image) that provides a sense of speed with the stationary main object and the flowing background. One conventionally proposed camera possesses a function that assists the user in panning in the follow shot. More specifically, this camera detects its panning velocity through a motion detecting unit, such as a gyro sensor, and obtains a moving velocity of the main object on a display screen based on a motion vector that is detected based on a video signal generated by image pickup. Then, this camera shifts a lens relative to a capturing optical axis so as to cancel the positional shift (image blur) of the main object on the display screen based on a difference between the panning velocity and the moving velocity, Thereby, even when the panning velocity made by the user fluctuates, this camera can provide a follow shot that restrains an image blur of the main object.

The main object to be captured by the follow shot includes not only an automobile that moves in a fixed direction, such as a horizontal direction, but also an airplane that moves up in the air at a variety of angles or in an unfixed direction. In capturing the main object through the follow shot, the panning velocity and the panning direction by the user fluctuate and the image of the main object is likely to blur.

Japanese Patent Laid-Open No. ("JP") 2006-115322 discloses a camera that corrects a live-view video based on a difference between an actual panning direction and a preset reference panning direction so that the actual panning direction approaches to the reference panning direction, and displays the corrected live-view video.

However, the camera disclosed in JP 2006-115322 limits the panning direction for restraining a blur of the main object in the follow shot, to the reference panning direction.

SUMMARY OF THE INVENTION

The present invention provides a panning index display apparatus that can provide a guidance display for enabling a follow shot user to recognize a proper panning speed and a proper panning direction.

A panning index display apparatus according to one aspect of the present invention includes a panning information acquiring unit configured to acquire a panning index of an image pickup apparatus based on an output of a motion detecting unit configured to detect a motion of the image pickup apparatus to be panned, a motion vector acquiring unit configured to acquire an object moving index indicative of a movement of an object based on a motion vector generated using an output of an image sensor in panning, and a display control unit configured to display a relationship between the panning index and the object moving index on a display unit. At least one processor or circuit is configured to perform a function of at least one of the units.

Further features of the present invention will become apparent from the following description of exemplary embodiments with reference to the attached drawings.

DESCRIPTION OF THE EMBODIMENTS

Referring now to the accompanying drawings, a description will be given of embodiments of the present invention.

First Embodiment

Figure 1:
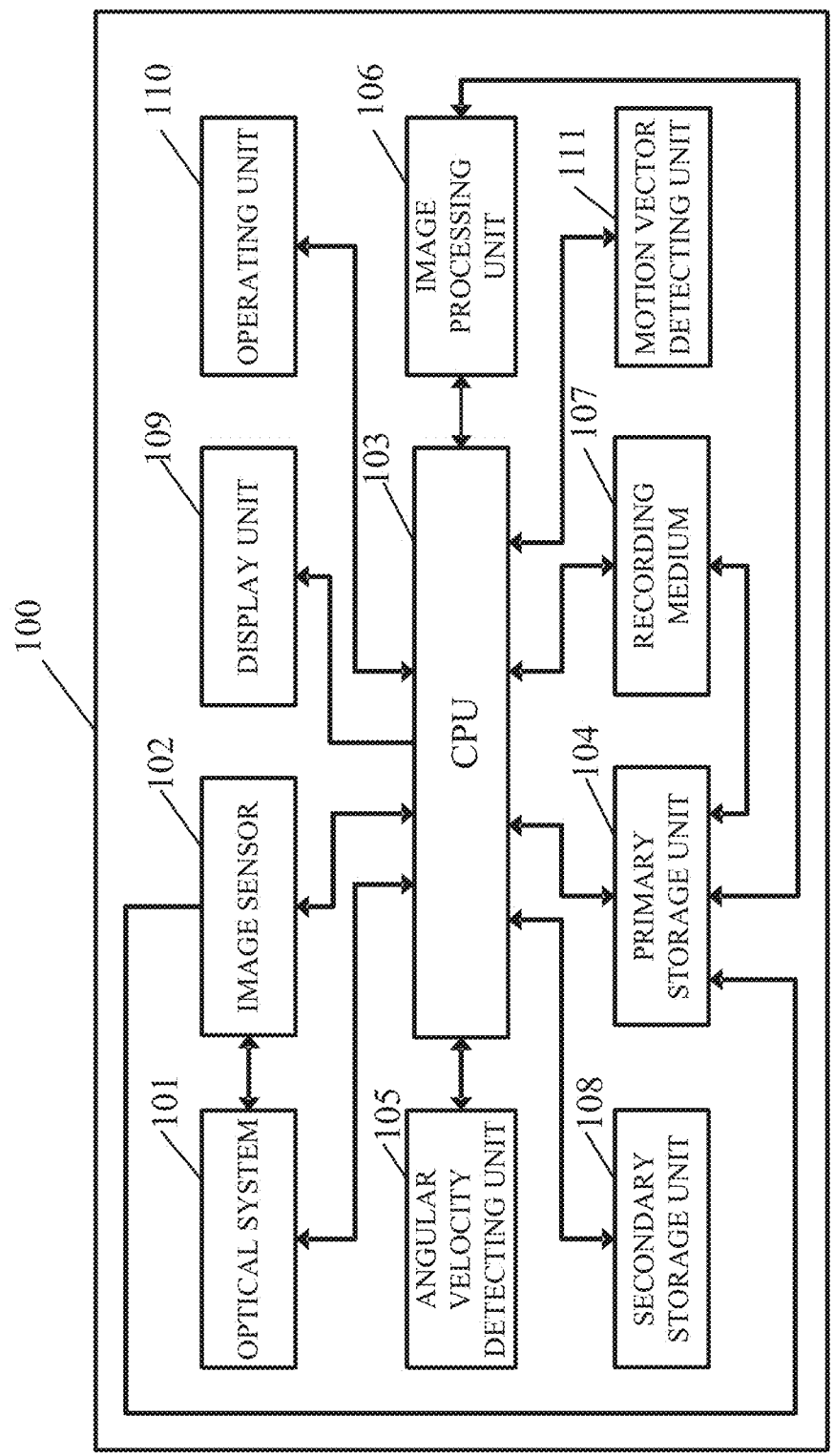
FIG. 1 is a block diagram illustrating a structure of an image pickup apparatus according to a first embodiment of the present invention.

FIG. 1 illustrates a basic structure of an image pickup apparatus 100 including a panning index display apparatus according to a first embodiment of the present invention. The image pickup apparatus 100 includes not only a digital camera, such as a digital still camera and a digital video camera, but also an electronic apparatus equipped with a camera function, such as a cellular phone having a camera function and a camera attached computer.

An optical system 100 includes a lens, a shutter, and a diaphragm, and forms an optical image of an object by forming an image on an image sensor 102 using light from the object under control of the CPU 103. The optical system 101 includes, as at least part of its components, a shift lens configured to shift in a direction orthogonal to an optical axis direction of the optical system 101 and to restrain a displacement of the optical image on the image sensor 102 (image pickup plane). In this embodiment, the optical system 101 includes the shift lens as its part but the entire optical system 101 may be shifted with the shift lens. The optical system, broadly includes the image sensor 102, and the image sensor 102 may shift from the optical axis.

The optical system. 101 may be provided in an interchangeable lens that can be attached to and detached from an image pickup apparatus body including the image sensor 102. In this case, the image pickup apparatus includes an interchangeable lens and an image pickup apparatus body.

The image sensor 102 includes a photoelectric conversion element, such as a CCD sensor and a CMOS sensor, and convers the optical image formed by the optical system 101 into an electric signal (captured signal).

An angular velocity detector 105 as a motion detecting unit includes a gyro sensor, detects the angular velocity of the image pickup apparatus 100, and outputs an electric signal (detection information) corresponding to the angular velocity to the CPU 103. The CPU 103 acquires panning information containing a panning angular velocity and a panning direction of the image pickup apparatus 100 using this detected angular velocity.

The CPU 103 controls an operation of each component that constitutes the image pickup apparatus 100 in accordance with an input signal and/or a previously stored computer program. The CPU 103 provides follow shot assist processing including a guidance display, which will be described later. The CPU 103 corresponds to a panning index display apparatus including a panning information acquiring unit, a motion vector acquiring unit, and a display control unit.

A primary storage unit 104 is a volatile memory, such as a RAM, and serves as a working space for the CPU 103 to temporarily store data, etc. The various data stored in the primary storage unit 104 is used for the image processing unit 106, or recorded in a recording medium 107. The secondary storage unit 108 is a nonvolatile memory, such as an EEPROM, and stores various setting information and an operation controlling program (firmware) for the image pickup apparatus 100 used for the CPU 103.

The recording medium 107 records data for recording use, such as image data obtained by image pickup for recording use. The recording medium 107 includes a semiconductor memory, which can be attached to and detached from the image pickup apparatus 100, and the recorded data can be read out of the personal computer, etc. In other words, the image pickup apparatus 100 has an attachment/detachment function of the recording medium 107, and data reading/writing function for the recording medium 107.

The display unit 109 displays a live-view video as a viewfinder video generated by image pickup for displaying use before the image pickup for recording use is made, and a (captured) image generated by the image pickup for recording use. The display unit 109 displays a GUI image, etc. for dialogue operation with the user. The operating unit 110 includes a variety of input devices used to accept an operation by the user, and to transmit the input information to the CPU 103, such as a contact operating member (e.g., a button, a lever, and a touch panel) and a noncontact input device using a voice and a line of sight.

A motion vector detector 111 as a motion vector detecting unit, detects a motion vector based on a video signal (referred to as a "live-view video signal" hereinafter) for a live-view video generated by the image pickup for displaying use. More specifically, this embodiment detects a motion vector indicative of a moving amount and a moving direction between corresponding points in a plurality of frames that constitute a live-view video signal. Alternatively, the CPU 103 may serve as the motion vector detector 111.

The image processing unit 106 generates a live-view video signal through various processing to a captured image output from the image sensor 102, and generates a still image and a motion image as an image for recording use. The image sensor 102 and the image processing unit 106 constitute a capturing system. Alternatively, the CPU 103 may execute at least part of functions of the image processing unit 106.

Figure 2:
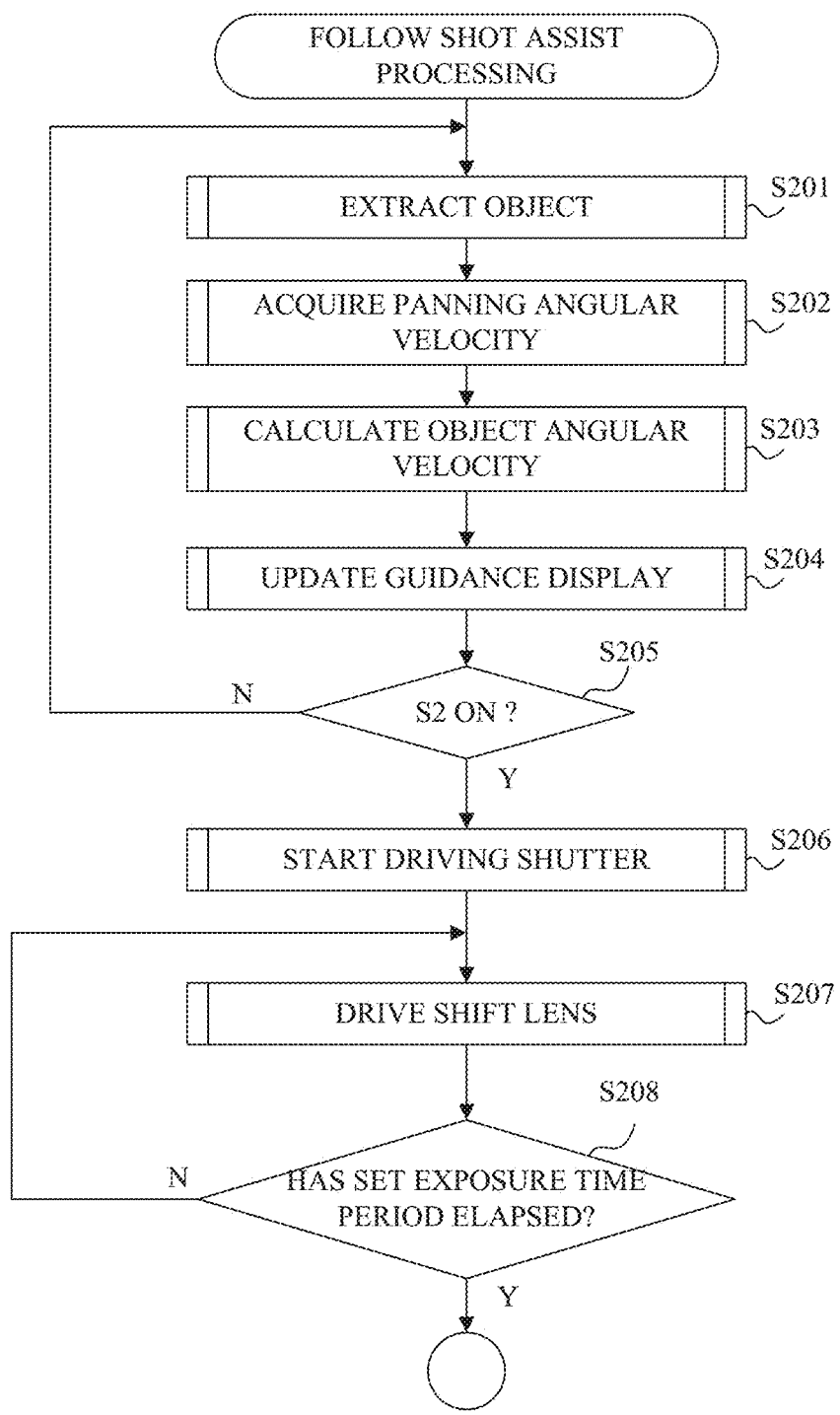
FIG. 2 is a flowchart illustrating follow shot assist processing according to the first embodiment.

Referring now to FIG. 2, a description will be given of follow shot assist processing performed by the CPU 103. The CPU 103 executes the follow shot assist processing in accordance with a follow shot assist program as a computer program stored in the secondary storage unit 108 when the user selects a follow shot assist mode through the operating unit 110.

Initially, in step S201, the CPU 103 extracts a main object to be captured, based on a live-view video signal generated during panning. The main object is extracted using a motion vector detected from the live-view video signal detected by the motion vector detector 111 by a method for extracting a main object area contained in the image of the main object (referred to as a "main object image" hereinafter) in the live-view video signal. A variety of conventional methods can be used to extract the main object area using the motion vector. When the main object cannot be extracted, the angular velocity of the main object, which will be described later, cannot be calculated and the CPU 103 does not continue the follow shot assist processing. In this case, the procedure may be switched to the normal image pickup that does not drive the shift lens in step S207, as described later.

Next, in step S202, the CPU 103 acquires information of a panning angular velocity of the image pickup apparatus 100 detected by the angular velocity detector 105 (panning velocity which will be referred to as a "panning angular velocity" hereinafter), and moves to step S203.

In step S203, the CPU 103 calculates an actual object angular velocity as an actual moving velocity (angular velocity) of the main object using the motion vector in the main object area. This embodiment calculates an object image angular velocity that is a moving velocity (angular velocity) of an optical image of the main object on the image sensor 102, as an angular velocity around a principal point of the optical system 101 as illustrated in FIG. 3.

Figure 3:
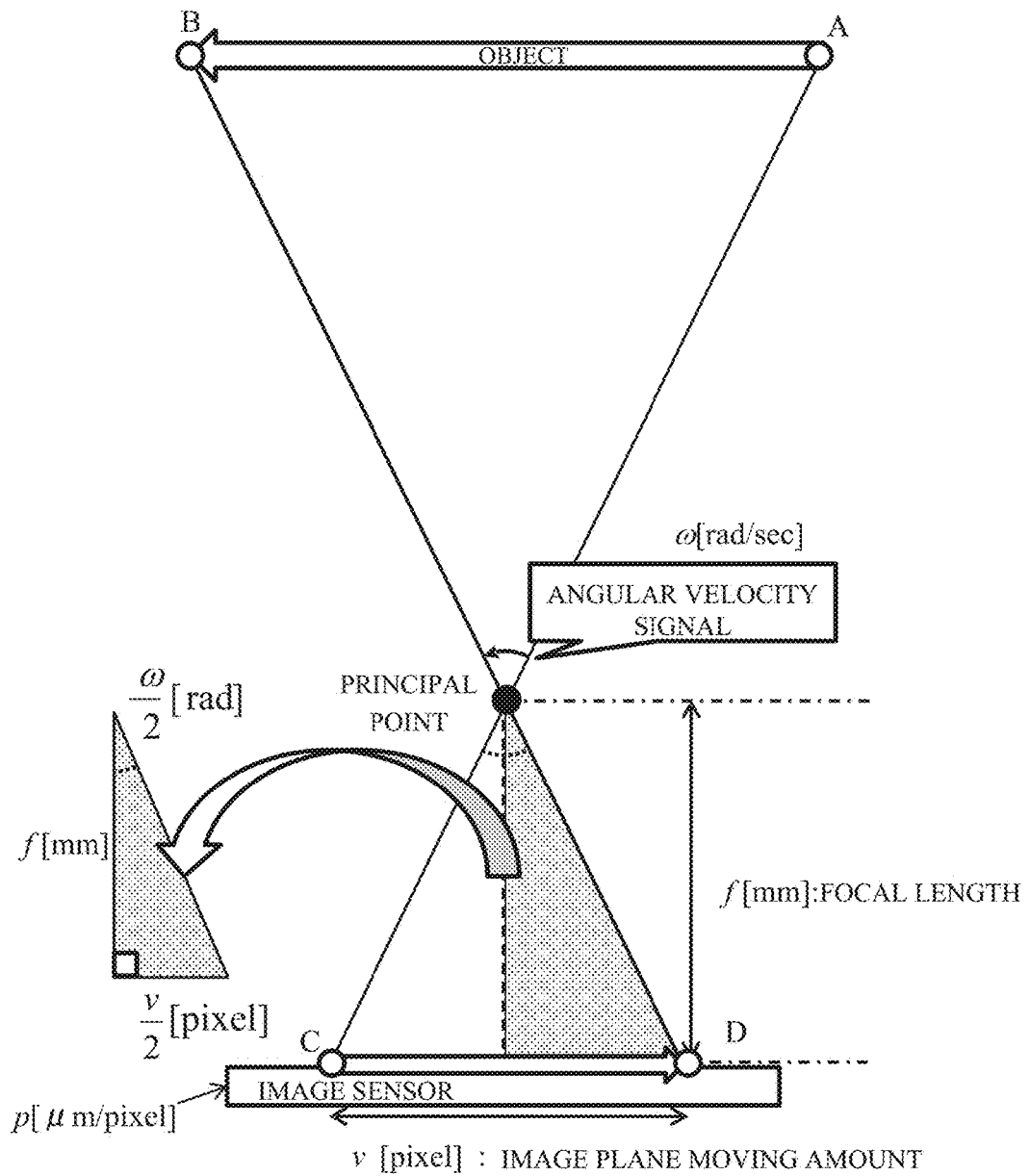
FIG. 3 is a view illustrating angular velocity signal calculating processing according to the first embodiment.

FIG. 3 illustrates that the actual main object moves from point A to point B for a period of t seconds, and that the optical image of the main object formed on the image sensor 102 (although simply illustrated as a "sensor" in FIG. 3) through the optical system 101 moves from point C to point D accordingly. An angular speed ω [rad/sec] of the main object image on the image plane of the image sensor 102 is expressed as follows where v [pixel] is a distance between the point C and the point D, f [mm] is a focal length of the optical system 101, and p [μm/pixel] is a pixel pitch of the image sensor 122.

Expression 1

$$\tan\frac{\omega}{2}[\text{rad}/\text{sec}] = \frac{v}{2}[\text{pixel}] \times \frac{p}{1000}[\text{mm}/\text{pixel}] \div t[\text{sec}] \div f[\text{mm}] = \frac{vp}{2000tf} \quad (1)$$

$$\omega = 2\tan^{-1}\left(\frac{vp}{2000tf}\right) [\text{rad}/\text{sec}]$$

When the image pickup apparatus 100 is panned, the angular velocity a of the object image on the image sensor 102 is expressed as follows by subtracting panning angular velocity $\omega_p$ from actual object angular velocity $\omega_s$.

Expression 2

$$\omega = \omega_s - \omega_p \quad (2)$$

Accordingly, the CPU 103 calculates the actual object angular velocity $\omega_s$ as follows by adding the panning angular velocity $\omega_p$ of the image pickup apparatus 100 detected by the angular velocity detector 105 to the object image angular velocity ω.

Expression 3

$$\omega_s = \omega + \omega_p \quad (3)$$

The actual object angular velocity $\omega_s$ can be calculated by a method other than the above calculation method. In addition, a user designated value through the operating unit 110 may be used for the actual object angular velocity $\omega_s$.

Next, the CPU 103 performs guidance display processing in the follow shot in step S204. More specifically, the CPU 103 updates a guidance display for panning use by performing processing illustrated in FIG. 4.

Next, in step S205, the CPU 103 determines whether the shutter button included in the operating unit 110 is fully pressed (referred to as "S2 ON" hereinafter) or whether an exposure operation of the image sensor 102 is to be performed for image pickup for recording use. If S2 is not turned on, the CPU 103 repeats the steps S201 to S204. If S2 is turned on, the CPU 103 moves to step S206.

In the step S206, the CPU 103 controls driving of the shutter included in the optical system 101 so as to expose the image sensor 102 for image pickup for recording use. In this case, the CPU 103 drives (shifts) the shift lens in the optical system 101 at a shift velocity corresponding to a difference between the actual object angular velocity and the panning angular velocity in the step S207. The CPU 103 executes the follow shot assist for restraining a displacement of the optical image of the main object on the image sensor 102 in the image pickup for recording use, and for restraining a blur of the image for recording use.

At last, in step S208, the CPU 103 determines whether the exposure for the image pickup for recording use has been completed. The CPU 103 continues to shift the shift lens in the step S207 when the exposure has not yet been completed, and ends this procedure when the exposure is completed.

Figure 4:
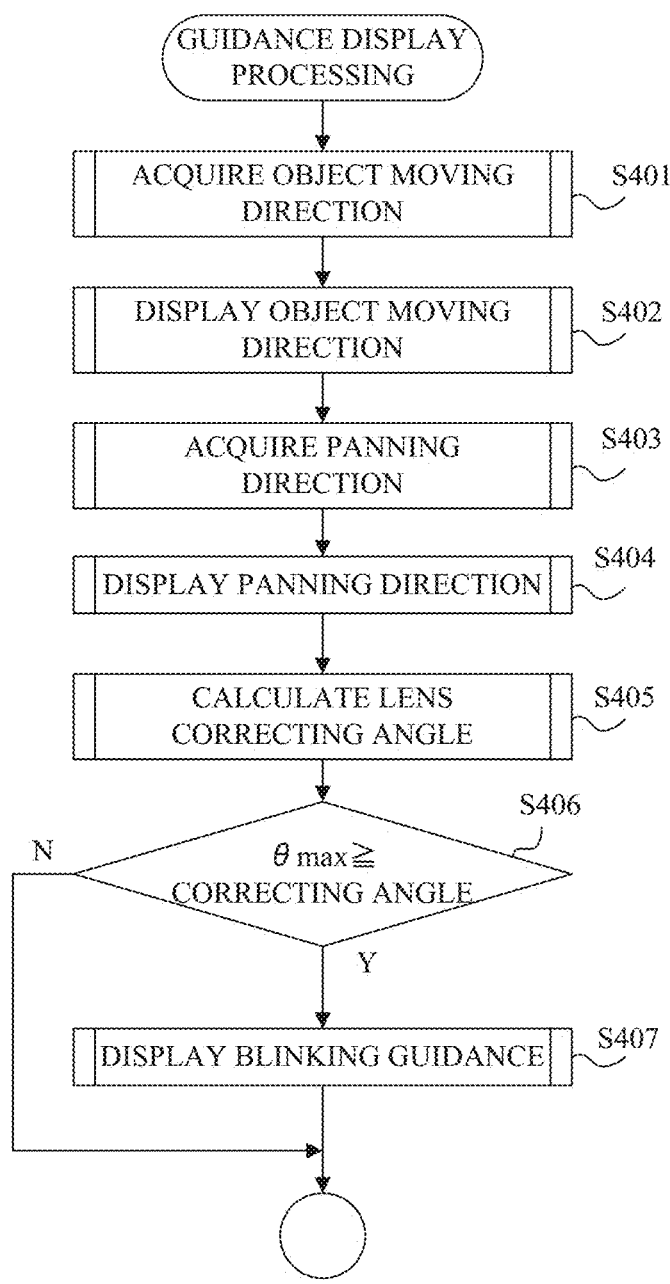
FIG. 4 is a flowchart illustrating guidance display processing according to the first embodiment.
Figure 5A:
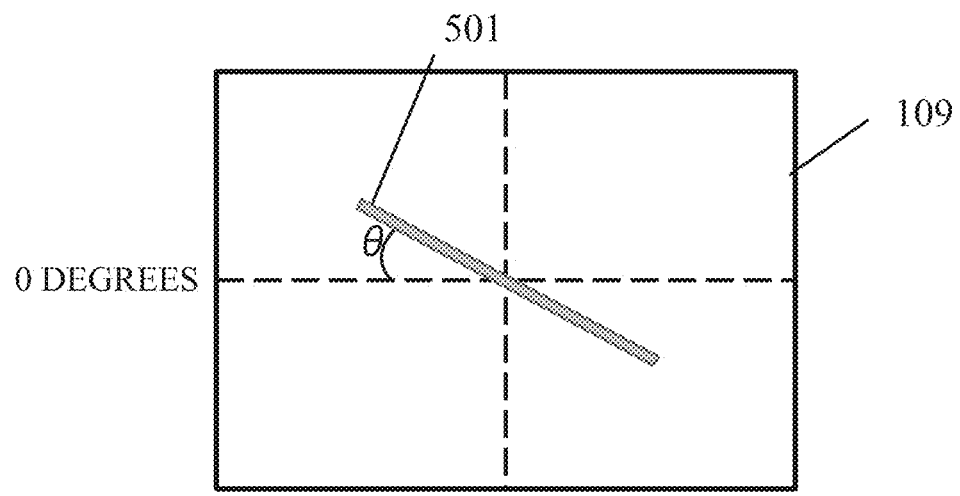
FIGS. 5A and 5B are views illustrating the guidance display according to the first embodiment.
Figure 5B:
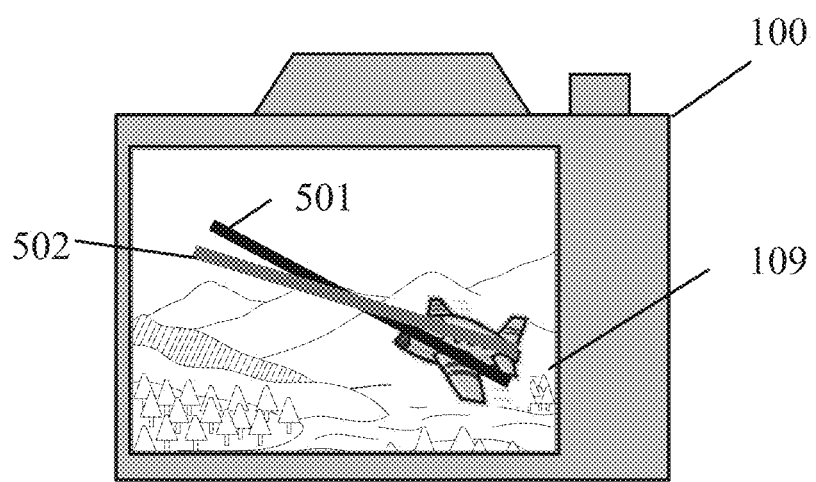

FIG. 4 illustrates a flow of the guidance display processing performed in the step S204. The CPU 103 executes the guidance display processing in accordance with a panning index display program as a computer program. FIGS. 5A and 5B illustrate illustrative guidance displays on the display unit 109 in the follow shot.

Initially, in step S401, the CPU 103 acquires a moving direction 9 containing a moving component to the vertical direction of the main object on the image sensor 102 based on the motion vector in the main object area detected by the motion vector detector 111.

Next, in step S402, the CPU 103 displays an object guidance bar 501 as a guidance (second index) corresponding to the moving direction 9 of the main object acquired in the step S401 on the display unit 109. Herein, the CPU 103 sets a horizontal direction to θ=0 degree and an up direction to a positive angle, and displays the object guidance bar 501 inclined by θ degrees relative to the horizontal direction at the center of the display screen of the display unit 109.

Next, in step S403, the CPU 103 detects a tilting angular velocity that is an angular velocity of panning (tilting) in the vertical direction of the image pickup apparatus 100 using the angular velocity detector 105. The CPU 103 calculates a direction (referred to as a "panning direction" hereinafter) θ' panning of the image pickup apparatus 100 using the tilting angular velocity. The panning direction θ' is expressed by an angle relative to the horizontal direction when the horizontal direction is set to θ'=0 degrees.

The panning direction θ' is expressed as follows where $\omega_r$ is the tilting angular velocity and t is time.
Expression 4

$$\theta' = \omega_r \times t \quad (4)$$

The time t is expressed as follows when n [1/sec] is a display updating (frame rewriting) frequency of the live-view video.

Expression 5

$$t = \frac{1}{n} \quad (5)$$

For example, when the display of the live-view video is updated at a frame rate of 30 fps is t=1/30[ sec], and the panning direction θ' is expressed as follows when the tilting angular velocity of the image pickup apparatus 100 becomes 24 [deg/sec]:
Expression 6

$$\theta' = 24 \times 1/30 = 0.8 \text{ [deg]} \quad (6)$$

Next, in step S404, the CPU 103 displays a panning guidance bar 502 as a guidance (first index) corresponding to the panning direction θ' on the display unit 109, as illustrated in FIG. 5B. FIG. 5B illustrates the object guidance bar 501 and panning guidance bar 502 on the display 109 superimposed on the live-view video including the airplane moving up in the air as the main object in an always lit display mode (lighting display).

Next, in step S405, the CPU 103 multiplies a difference between the tilting angular velocity and the actual object angular velocity in the vertical direction calculated using the motion vector by an exposure time period for image pickup for recording use. This embodiment calculates an angle (referring to as a "correcting angle" hereinafter) for correcting a shift in the panning direction relative to the actual moving direction of the main object by shifting the shift lens.

Next, in step S406, the CPU 103 determines whether the correcting angle is larger than a maximum correctable angle $\theta_{max}$ [deg] as a correcting angle obtained by shifting the shift lens by a maximum, shift amount. The maximum correctable angle $\theta_{max}$ may be previously stored in the secondary storage unit 108, and read out in the determination of this step. When the optical system 101 is provided in the interchangeable lens, the information of the maximum correctable angle is obtained from the interchangeable lens through communications before the determination of this step. When the correcting angle is not larger than the maximum correctable angle, the CPU 103 moves to the step S205 described in FIG. 2.

When the correcting angle is larger than the maximum correctable angle, the CPU 103 moves to the step S407. In this case, a difference between the object moving direction θ displayed by the object guidance bar 501 and the panning direction θ' displayed by the panning guidance bar 502 is beyond the correctable range (predetermined size) available by shifting the shift lens.

In the step S407, the CPU 103 informs the user that the follow shot assist is imperfect (or impossible), and thus the display mode of at least one of the object and the panning guidance bars 501 and 502 is changed from the always lit display mode to the flashing or blinking display mode. In other words, this embodiment provides a warning display by blinking one or more of the object and the panning guidance bars 501 and 502.

Thus, this embodiment displays the guidance bars 501 and 502 in the live-view video so as to enable the user to visually recognize a shift between the panning direction of the image pickup apparatus 100 and the moving direction of the main object in the display of the live-view video before image pickup for recording use by the follow shot is made. Thereby, the user can adjust the panning direction while viewing the live-view video, and can obtain a follow shot in which an image blur of the main object is restrained, The guidance bar may express a difference between the angular velocity of the object (actual object angular velocity) and the panning angular velocity of the image pickup apparatus 100. For example, the length of the panning guidance bar 502 may be displayed on the basis of the length of the object guidance bar 501 and reflects the difference from the angular velocity. That is, the panning guidance bar 502 is shorter than object guidance bar 501 when the panning angular velocity is slower and longer when the panning angular velocity is faster, When the frame image of the live-view video, which is finally generated before the exposure is made, is continuously displayed in the exposure for image pickup for recording use, the guidance bars 501 and 502 may be continuously displayed with the frame image. Thereby, the user can adjust the panning direction and panning velocity in the exposure for image pickup for recording use according to a movement of the main object.

FIGS. 5A and 5B illustrate the guidance bars 501 and 502 at the center of the display screen on the display unit 109, but they may be displayed at an arbitrary area on the display screen. For example, they may be displayed at one of four corners on the display screen or the user can freely select the display area on the display screen of the display unit 109 using the touch panel.

Second Embodiment

Next follows an image pickup apparatus that includes a panning index display apparatus according to a second embodiment of the present invention. Those elements in the image pickup apparatus according to this embodiment have the same basic structures for those in the image pickup apparatus 100 according to the first embodiment (FIG. 1) and those elements in this embodiment which are corresponding elements in the first embodiment will be designated by the same reference numeral.

Even in this embodiment, the CPU 103 corresponds to the panning index display apparatus. The CPU 103 displays on the display unit 109 an object guidance indicative of a difference between a moving direction of a main object and a panning direction and a difference between a moving velocity of a main object and a panning velocity and a correcting guidance indicative of a maximum correctable angle $\theta_{max}$. The CPU 103 changes an object guidance according to an exposure time period in image pickup for recording use and an image pickup condition, such as a focal length of the optical system 101. Thereby, the CPU 103 provides a better follow shot than that of the first embodiment.

Figure 6:
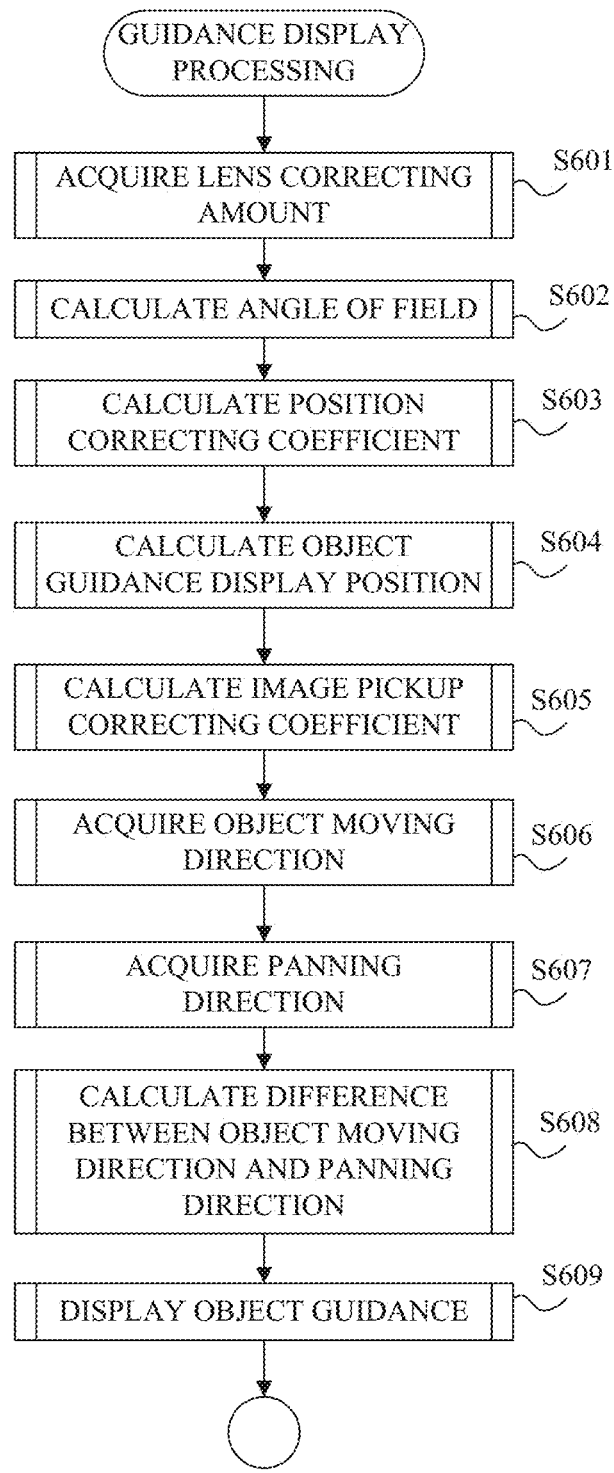
FIG. 6 is a flowchart illustrating guidance display processing according to a second embodiment of the present invention.

FIG. 6 illustrates a flow of guidance display processing performed in the step S204 in the follow shot assist processing according to the first embodiment with reference to FIG. 4. The CPU 103 executes the guidance display processing in accordance with a panning index display program as a computer program. FIGS. 7A to 7E illustrate guidance examples displayed on the display unit 109 in the follow shot.

Figure 7A:
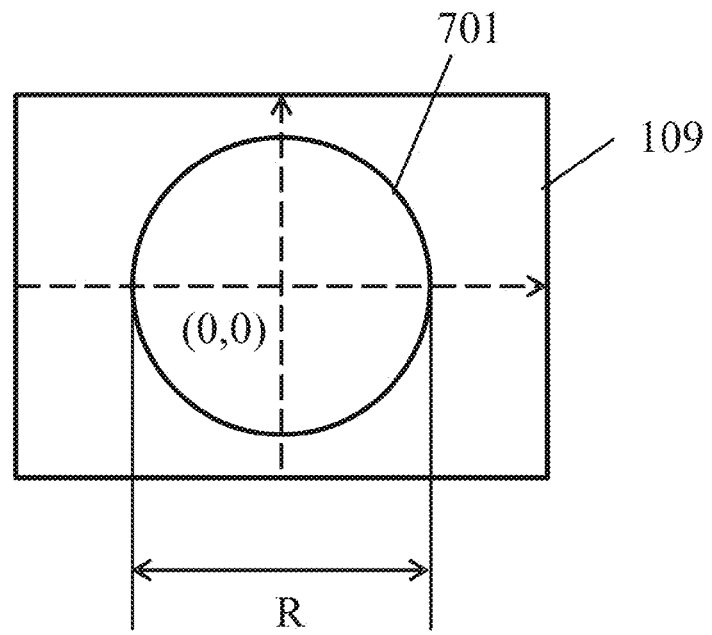
FIGS. 7A to 7E are views illustrating the guidance display according to the second embodiment.

In step S601 in FIG. 6, the CPU 103 displays on the display unit 109, as illustrated in FIG. 7A, a correcting guidance (first index) 701 indicative of a maximum correctable angle $\theta_{max}$ [deg] obtained by shifting the shift lens by the maximum shift amount. The correcting guidance 701 is an index indicative of a range in which the displacement can be restrained in the follow shot assist function for restraining the displacement of the optical image of the object on the image plane by moving at least part of the optical system 101. This embodiment displays the correcting guidance 701 as a circle having a diameter R [pixel] and an origin (0, 0) set to the center of the display screen of the display unit 109. The user may previously set the diameter R as long as the diameter R is smaller than the resolution of the display unit 109.

Figure 8:
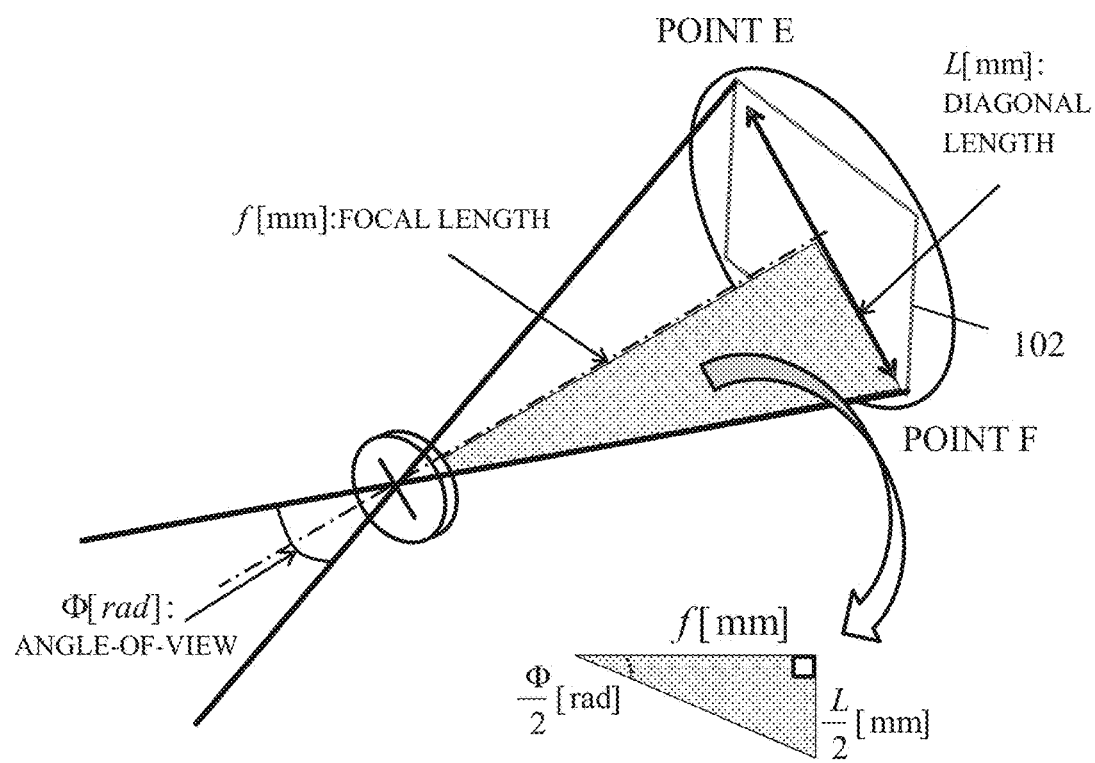
FIG. 8 is a view of angle-of-view calculating processing according to the second embodiment.

Next, in step S602, the CPU 103 calculates an angle of view. Referring now to FIG. 8, a description will be given of a calculating method of the angle of view. An angle of view φ [rad] is an angle between two lines that pass points E and F on the image sensor 102 and intersect at a point distant from the image sensor 102 on the optical axis of the optical system 101 by a focal length f [mm]. The angle of view φ is expressed as follows where L [mm] is a length between the point E and the point F (referred to as a "diagonal length" hereinafter) on the image sensor 102.

Expression 7

$$\tan\left(\frac{\Phi}{2}\right) = \frac{L}{2} \div f \qquad (7)$$

$$\Phi = 2\tan^{-1}\left(\frac{L}{2f}\right)$$

The CPU 103 can obtain information on the focal length of the optical system 101 through an unillustrated zoom detector, or a communication with the interchangeable lens when the optical system 101 is provided in the interchangeable lens. Instead of the calculation of the angle of view using Expression (7), the CPU 103 may read out the angle of view stored with a corresponding focal length in the secondary storage unit 108.

Next, in step S603, the CPU 103 calculates a position correcting coefficient. The correcting coefficient is expressed as follows.

Expression 8

$$\alpha = \frac{\Phi}{\Phi + \theta_{max} \times 2} \qquad (8)$$

Next, in step S604, the CPU 103 calculates a display position v' of the object guidance. More specifically, the CPU 103 initially calculates the object image angular velocity ω on the image sensor 102 (image plane) in accordance with Expression (2) with the panning angular velocity $\omega_p$ obtained in the step S202 and the actual object angular velocity $\omega_s$ calculated with the motion vector $\omega_p$ in the step S203 in FIG. 2. The CPU 103 calculates a distance v [pixel] by which the optical image of the main object moves on the image plane, using the following expression lead from Expression (1) and the object image angular velocity ω. The time period t. [sec] is calculated in accordance with Expression (5) and the display updating frequency n [1/sec] of the live-view video.

Expression 9

$$v = \frac{2000tf}{p} \times \tan\left(\frac{\omega}{2}\right) \qquad (9)$$

The CPU 103 calculates the display position v' of the object guidance using the resolution W [pixel] of the display unit 109 as follows:

Expression 10

$$v' = v \times \alpha \times \frac{R}{W} \quad (10)$$

The thus calculated display position v' of the object guidance corresponds to the object image angular velocity ω (referred also to as a "panning velocity difference" hereinafter which is a difference between the object image angular velocity (actual object angular velocity) $\omega_s$ and the panning angular velocity $\omega_p$).

Next, in step S605, the CPU 103 calculates an image pickup correcting coefficient. More specifically, the CPU 103 calculates the image pickup correcting coefficient β in accordance with the following expression with the object image angular velocity ω [rad/sec] on the image plane and the exposure time period t for image pickup for recording use.

Expression 11

$$\beta = \frac{\omega \times t}{\theta_{max}} \quad (11)$$

The denominator in Expression (11) is the maximum correctable angle $\theta_{max}$ obtained by the shift lens, and the numerator is the correcting angle obtained by the moving angle of the optical image of the main object on the image plane or the shift lens. Hence, β represents an availability of the follow shot assist effect (referred to as an "assist availability" hereinafter) by shifting the shift lens. As β reduces, a margin of the maximum correctable angle $\theta_{max}$ is narrower for the correcting angle and the assist availability becomes lower. On the contrary, as β increases, the margin of the maximum correctable angle $\theta_{max}$ is wider for the correcting angle and the assist availability becomes higher.

Next, in step S606, the CPU 103 obtains a moving direction (angle) $\theta_s$ of the main object.

Next, in step S607, the CPU 103 obtains a panning direction $\theta_p$ of the image pickup apparatus 100 detected by the angular velocity detector 105.

Next, in step S608, the CPU 103 calculates a difference T (referred to as a "panning direction difference" hereinafter) between $\theta_s$ and $\theta_p$ obtained in the steps S606 and S607.

Expression 12

$$T = \theta_s - \theta_p \quad (12)$$

Figure 7B:
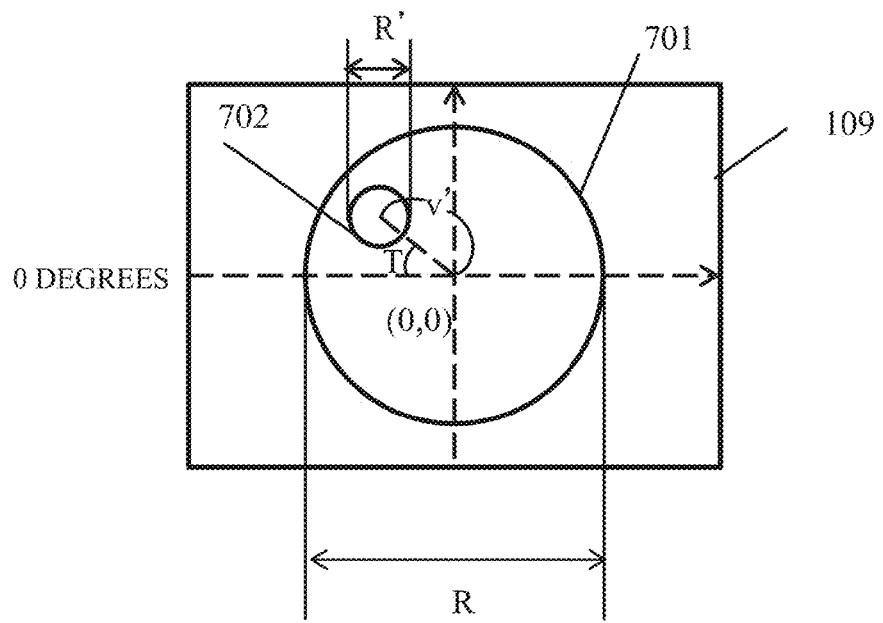

Next, in step S609, the CPU 103 displays on the display unit 109, as illustrated in FIG. 7B, an object guidance (second index) 702 at a position distant from the center or origin (0, 0) of the display screen by v' calculated in the step S604 in the angular direction corresponding to the panning direction difference T. Herein, the CPU 103 sets the horizontal direction on the display screen to the panning direction difference T=0 degree, and displays the object guidance 702 based on the diameter R [pixel] displayed in the step S601 and the values calculated in the steps S603 to S608. The object guidance 702 is a circle having a diameter R' calculated as follows.

Expression 13

$$R' = R \times \beta \quad (13)$$

Thus, as illustrated in FIG. 7B, the correcting guidance 701 indicates the maximum correctable angle and the display position and size of the object guidance 702 relative to the correcting guidance 701 express the panning direction, the panning velocity difference, and the assist availability. While FIGS. 7A to 7E do not illustrate the live-view video, the correcting guidance 701 and the object guidance 702 are actually superimposed on the live-view video, as described later with reference to FIGS. 9A to 9E.

Figure 7C:
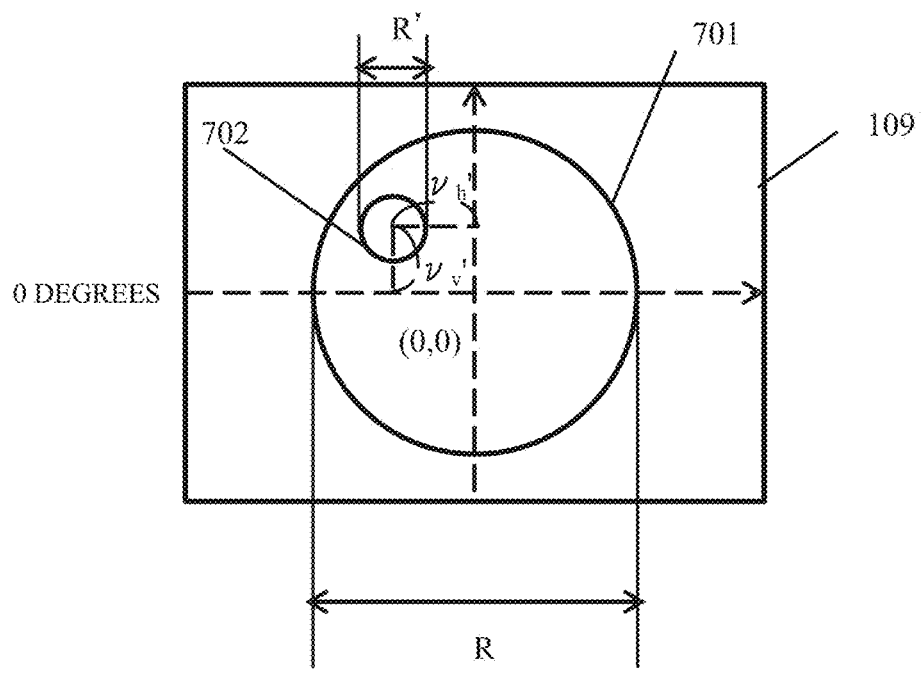

The panning direction difference that is a difference between the moving direction of the object and the panning direction is thus calculated. Alternatively, as illustrated in FIG. 7C, display positions $v_h'$ and $v_v'$ [pixel] of the object guidance 702 may be calculated in the horizontal and vertical directions of the main object, by using the angular velocities in these respective directions. In this case, instead of the steps S606 to S608, the step S604 may be performed in each of the horizontal direction and the vertical direction.

Figure 7D:
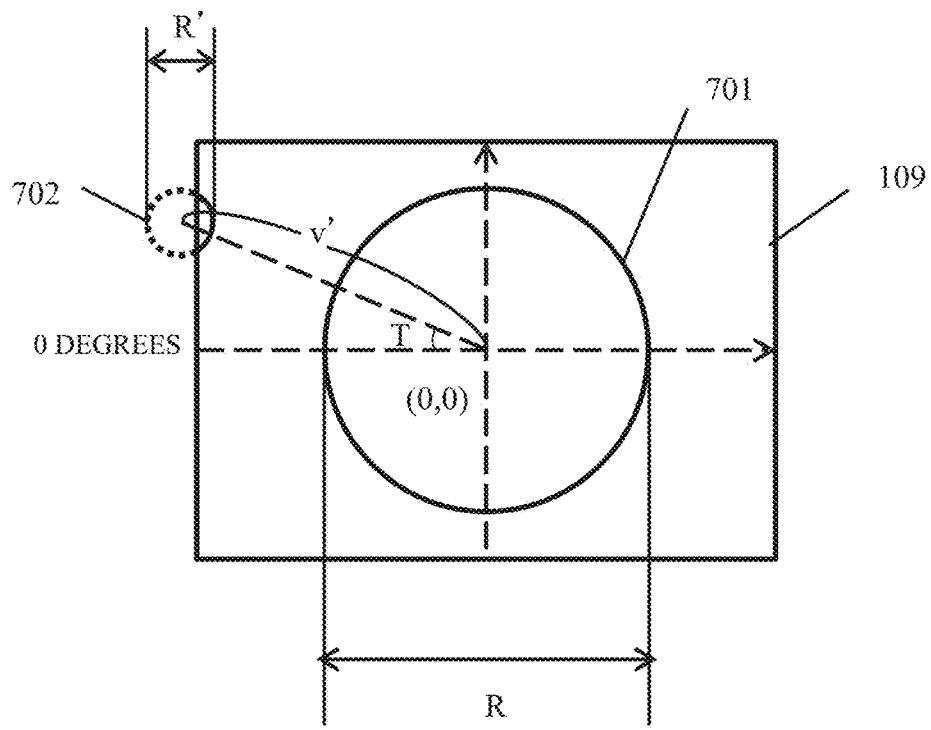
Figure 7E:
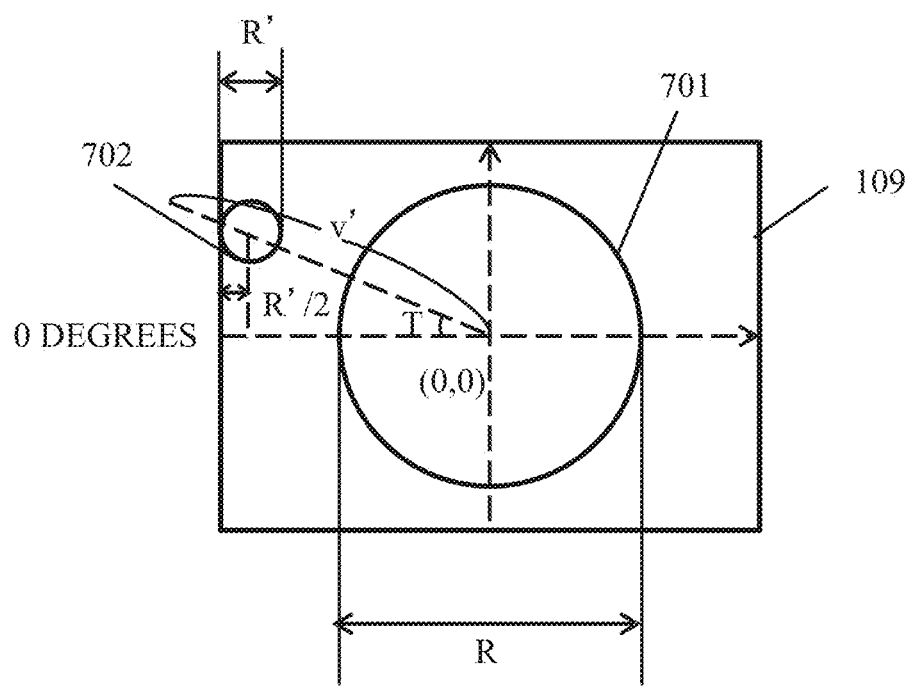

When part of the displayed object guidance is located outside of the display screen of the display unit 109 due to the calculation result of Expressions (10) and (13), the CPU 103 may display only the part of the object guidance located inside of the display screen, as illustrated in FIG. 7D. In addition, as illustrated in FIG. 7E, the CPU 103 may display it at a position offset from the display screen end by R'/2 with a warning display, such as a blinking display, so as to inform the user that the object guidance is located outside the display screen.

This embodiment additionally display the object guidance on the live-view video so as to display information on a difference between the panning of the image pickup apparatus and a movement of the object, such as a panning velocity difference and a panning direction difference, and the assist availability. Thereby, the user can visually recognize whether he is properly panning the image pickup apparatus in accordance with the movement of the object, and whether he is getting the good follow shot assist effect.

Referring now to FIGS. 9A to 9D, a description will be given of a display example of the guidance according to this embodiment. FIGS. 9A to 9D illustrates an example in which a correction guidance 901 and an object guidance 902 are superimposed on the live-view video containing the airplane that is flying in the air as a main object on the display unit 109.

Figure 9A:
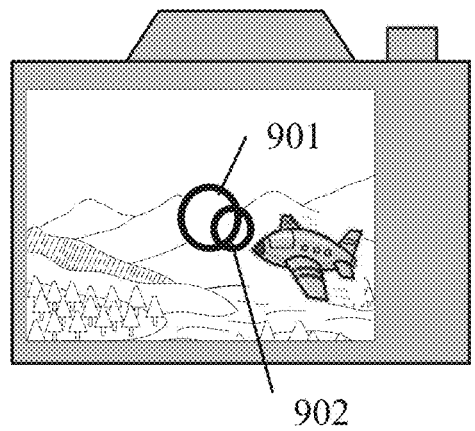
FIGS. 9A to 9D are views illustrating illustrative guidance displays according to the second embodiment.
Figure 9C:
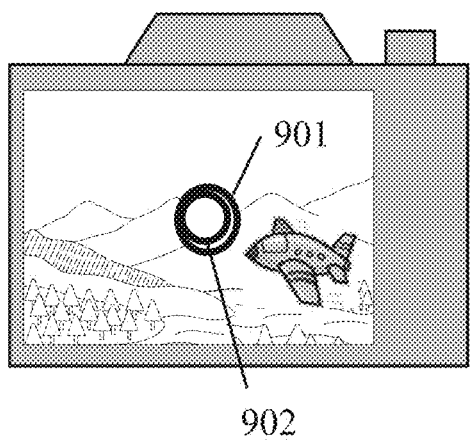
Figure 9B:
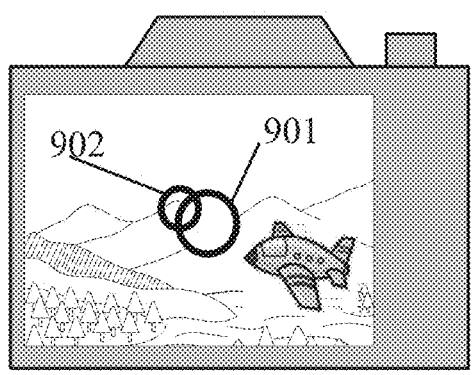

When the panning velocity is faster than the actual object moving velocity, v' becomes 0 or larger. Therefore, as illustrated in FIG. 9A, the display position of the object guidance 902 shifts (delays) to the right side of the correcting guidance 901. On the contrary, when the panning velocity is slower than the actual object moving velocity, v' becomes 0 or smaller. Therefore, as illustrated in FIG. 9B, the display position of the object guidance 902 shifts (precedes) to the left side of the correcting guidance 901.

Figure 9D:
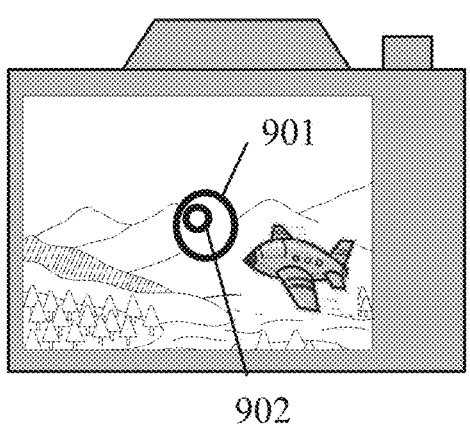

When the exposure time period for image pickup for recording use is longer, R' becomes larger. As illustrated in FIG. 9C, the displayed object guidance 902 is approximately as large as the correcting guidance 901, and the assist availability is low. On the contrary, when the exposure time period for image pickup for recording use is shorter, R' becomes smaller. As illustrated in FIG. 9D, the displayed object guidance 902 is smaller than the correcting guidance 901, and the assist availability is high.

When the maximum correctable angle $\theta_{max}$ changes in accordance with the focal length, R' becomes larger when $\theta_{max}$ reduces due to the change of the focal length (see Expressions (11) and (13)). Therefore, the displayed object guidance 902 is approximately as large as the correcting guidance 901 as illustrated in FIG. 9C, and the assist availability is low. On the contrary, R' becomes smaller when the maximum correctable angle $\theta_{max}$ increases due to the change of the focal length, as illustrated in FIG. 9D, the displayed object guidance 902 is smaller than the correcting guidance 901, and the assist availability is high.

This embodiment sets the left direction of the display unit 109 to the positive direction, but may set the same direction as the panning direction to the positive direction.

A release time lag is a time period from full pressing of the shutter button (S2 ON) to actual drive starting of the shutter. This embodiment may consider (as a parameter) the release time lag in calculating the correcting angle in addition to the exposure time period so as to improve the calculating precision of the correcting angle and to provide a better follow shot. For the processing rate of the motion vector detector 111, a time period from time of obtaining the latest detection result to time of full pressing of the shutter button may be set to a parameter of calculating the correcting angle.

Even when the frame image of the live-view video, which is finally generated before the exposure is made, is continuously displayed in the exposure for image pickup for recording use, both guidance marks 901 and 902 may be continuously displayed with the frame image for the reason described in the first embodiment. As described in the first embodiment, both guidance marks 901 and 902 may be displayed at any areas in the display screen of the display unit 109, or the user may freely set the display area, Each embodiment provides the follow shot user a guidance display so as to reduce a difference between the panning direction and the moving direction of the main object and a difference between the panning velocity and the moving velocity of the main object or to enable him to visually recognize the proper panning velocity and direction. Thus, each embodiment can provide a good follow shot for restraining the image blur of the main object irrespective of the moving direction and the moving velocity of the main object.

Other Embodiment

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-102742, filed May 20, 2015, which is hereby incorporated by reference herein in its entirety.

What is claimed is:

1. A panning information display apparatus comprising:
at least one processor or circuit programed to perform the following operations:
acquiring panning information of an image pickup apparatus based on an output of a motion detecting unit configured to detect a motion of the image pickup apparatus to be panned;
acquiring object moving information indicative of a movement of an object image based on a motion vector generated using an output of an image sensor panning; and
controlling driving an optical element in a direction different from an optical axis direction based on the panning information and the object moving information,
wherein the at least one processor or circuit controls to display on a display unit information on whether a relationship between the panning information and the object moving information is within a follow shot available roan e that is determined by driving the optical element, and
wherein the panning information contains information on at least one of a panning direction and a panning amount, and the object moving information contains information on at least one of an object moving direction and an object moving amount.

2. The panning information display apparatus according to claim 1, wherein the display unit displays an image based on an image signal acquired by the image sensor and the information on whether the relationship between the panning information and the object moving information is within the follow shot available range that is determined by driving the optical element.

3. The panning information display apparatus according to claim 2, wherein the at least one processor or circuit changes information indicative of the relationship between the panning information and the object moving information based on at least one of a focal length d an exposure tune period.

4. The panning information display apparatus according to claim 1, wherein the at least one processor or circuit controls to display information on whether a difference between the panning direction and the object moving direction is within the follow shot available range.

5. The panning information display apparatus according to claim 1, wherein the at least one processor or circuit controls to display information on whether the object moving amount is within the follow shot available range.

6. A method for executing display processing of panning information comprising the steps of:

acquiring the panning information of an image pickup apparatus based on an output of a motion detecting unit configured to detect a motion of the image pickup apparatus to be panned;

acquiring object moving information indicative of a movement of an object image based on a motion vector generated using an output of an image sensor in panning; and driving an optical element in a direction different from an optical axis direction based on the panning information and the object moving information, wherein information on whether a relationship between the panning information and the object moving information is within a follow shot available range that is determined by driving the optical element is displayed on a display unit, and wherein the panning information contains information on at least one of a panning direction and a panning amount, and the object moving information contains information on at least one of an object moving direction and an object moving amount.

* * * * *